US010289453B1

(12) United States Patent
Wei et al.

(10) Patent No.: US 10,289,453 B1
(45) Date of Patent: May 14, 2019

(54) ALLOCATING COMPUTING RESOURCES

(75) Inventors: Eric P. Wei, Seattle, WA (US); Eric J. Brandwine, Haymarket, VA (US); Andrew B. Dickinson, Seattle, WA (US); James A G Greenfield, Cape Town (ZA); Diwakar Gupta, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1354 days.

(21) Appl. No.: 12/961,881

(22) Filed: Dec. 7, 2010

(51) Int. Cl.
*H04L 12/24* (2006.01)
*G06F 9/4401* (2018.01)
*G06F 9/50* (2006.01)
*G06Q 30/08* (2012.01)
*H04L 29/08* (2006.01)

(52) U.S. Cl.
CPC ............ *G06F 9/505* (2013.01); *G06Q 30/08* (2013.01); *H04L 67/1097* (2013.01)

(58) Field of Classification Search
CPC ....... G06F 2209/5018; G06F 2209/503; G06F 2209/508; G06F 9/50; G06F 9/5027
USPC .......................... 709/220–222; 707/770, 803
See application file for complete search history.

(56) References Cited

U.S. PATENT DOCUMENTS

| 6,625,709 | B2 * | 9/2003 | Aiken .................... G06F 9/5016 711/170 |
| 6,728,266 | B1 * | 4/2004 | Sabry et al. .................. 370/468 |
| 7,085,825 | B1 * | 8/2006 | Pishevar ............. H04L 67/1095 709/204 |
| 7,813,993 | B1 * | 10/2010 | Barto ..................... G06Q 40/00 705/37 |
| 7,886,021 | B2 * | 2/2011 | Scheifler ................. G06F 9/485 709/217 |
| 8,151,077 | B1 * | 4/2012 | Bauer ................. G06F 12/0802 711/118 |
| 8,286,176 | B1 * | 10/2012 | Baumback ............ G06F 9/5061 718/104 |
| 8,392,312 | B2 * | 3/2013 | Batsakis ................. G06F 9/505 705/26.3 |
| 8,464,255 | B2 * | 6/2013 | Nathuji ................. G06F 9/5077 718/1 |
| 2003/0101213 | A1 * | 5/2003 | Wright .................... H04L 29/06 709/203 |
| 2003/0187865 | A1 * | 10/2003 | Frisina ............. G05B 19/41865 |
| 2003/0220944 | A1 * | 11/2003 | Lyman Schottland ...................... G06F 8/658 |
| 2003/0236854 | A1 * | 12/2003 | Rom ....................... H04L 47/15 709/217 |

(Continued)

*Primary Examiner* — Asad M Nawaz
*Assistant Examiner* — Berhanu D Belete
(74) *Attorney, Agent, or Firm* — Thomas | Horstemeyer, LLP

(57) ABSTRACT

Disclosed are various embodiments for allocating computing resources. A request to allocate a computing resource in a collection of networked computing devices is obtained. It is determined whether the request can be fulfilled according to a current configuration of the networked computing devices. A reconfiguration of one or more of the networked computing devices to a different configuration is initiated in order to fulfill the request. The reconfiguration is initiated when a value associated with the request exceeds a cost associated with fulfilling the request. The reconfiguration is initiated in response to determining that the request cannot be fulfilled according to the current configuration.

29 Claims, 6 Drawing Sheets

(56) References Cited

U.S. PATENT DOCUMENTS

| | | | |
|---|---|---|---|
| 2004/0166835 A1* | 8/2004 | Johansson | H04W 28/18 455/414.1 |
| 2006/0143617 A1* | 6/2006 | Knauerhase | G06F 9/50 718/104 |
| 2006/0184935 A1* | 8/2006 | Abels | G06F 9/5077 718/1 |
| 2006/0184937 A1* | 8/2006 | Abels | G06F 8/65 718/1 |
| 2006/0224496 A1* | 10/2006 | Sandholm | G06Q 30/02 705/37 |
| 2007/0169109 A1* | 7/2007 | Neswal | G06F 8/61 717/174 |
| 2007/0245010 A1* | 10/2007 | Arn | H04L 67/1008 709/223 |
| 2008/0028402 A1* | 1/2008 | Senoo | G06F 9/4856 718/1 |
| 2008/0052219 A1* | 2/2008 | Sandholm | G06Q 30/08 705/37 |
| 2008/0103885 A1* | 5/2008 | Hashim | G06Q 30/02 705/14.39 |
| 2008/0195447 A1* | 8/2008 | Bouillet | G06F 9/5061 705/7.25 |
| 2009/0265205 A1* | 10/2009 | Stinchcombe | G06Q 10/06 705/37 |
| 2009/0265707 A1* | 10/2009 | Goodman | G06F 9/5016 718/1 |
| 2009/0271472 A1* | 10/2009 | Scheifler | G06F 9/485 709/202 |
| 2009/0288074 A1* | 11/2009 | Carroll et al. | 717/158 |
| 2010/0042720 A1* | 2/2010 | Stienhans et al. | 709/226 |
| 2010/0076856 A1* | 3/2010 | Mullins | G06Q 30/0601 705/26.1 |
| 2010/0088205 A1* | 4/2010 | Robertson | 705/34 |
| 2010/0106332 A1* | 4/2010 | Chassin | G06Q 20/102 700/278 |
| 2010/0107158 A1* | 4/2010 | Chen | G06F 11/1438 718/1 |
| 2010/0131592 A1* | 5/2010 | Zhang et al. | 709/203 |
| 2010/0131649 A1* | 5/2010 | Ferris | G06F 9/5072 709/226 |
| 2010/0131949 A1* | 5/2010 | Ferris | G06F 9/5027 718/1 |
| 2010/0223364 A1* | 9/2010 | Wei | H04L 29/04 709/220 |
| 2010/0274668 A1* | 10/2010 | Langston | G06Q 30/02 705/14.55 |
| 2010/0299366 A1* | 11/2010 | Stienhans | G06F 9/5072 707/803 |
| 2011/0004500 A1* | 1/2011 | Nathuji | G06F 1/3203 705/7.37 |
| 2011/0004574 A1* | 1/2011 | Jeong | G06N 5/02 706/12 |
| 2011/0055398 A1* | 3/2011 | Dehaan et al. | 709/226 |
| 2011/0106922 A1* | 5/2011 | Bouillet | G06F 9/5077 709/221 |
| 2011/0209064 A1* | 8/2011 | Jorgensen | G06F 9/4445 715/733 |
| 2011/0225299 A1* | 9/2011 | Nathuji | G06F 9/5077 709/226 |
| 2011/0295986 A1* | 12/2011 | Ferris | G06F 9/5072 709/222 |
| 2012/0005236 A1* | 1/2012 | Deng | G06F 8/10 707/798 |
| 2012/0005342 A1* | 1/2012 | Deng | G06F 9/5044 709/225 |
| 2012/0047239 A1* | 2/2012 | Donahue | G06F 9/5072 709/220 |
| 2012/0109852 A1* | 5/2012 | Lingam | G06F 9/5083 705/400 |
| 2012/0123898 A1* | 5/2012 | Kirkeby | G06Q 30/0631 705/26.7 |
| 2015/0244595 A1* | 8/2015 | Oberlin | H04L 41/5025 709/224 |

\* cited by examiner

ALLOCATING COMPUTING RESOURCES

BACKGROUND

A cloud computing resource may comprise a multitude of networked computing devices executing instances of virtual machines associated with customers. Customers may be capable of terminating machine instances or launching machine instances whenever they desire, thereby providing an elastic computing resource. Accordingly, customer applications executed in an elastic computing resource may be scaled as desired to handle practically any level of peak demand. Such an elastic computing resource may be very useful to customers who benefit from not having to invest in and maintain an expensive hardware infrastructure that may not be needed at all times.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to allocating computing resources within a plurality of networked computing devices such as, for example, a cloud computing resource. When a customer submits a request to allocate computing resources, the current configuration of the cloud computing resource may not have available unallocated capacity for fulfilling the request. However, it may be the case that certain constituent computing devices may be reconfigured to accommodate the requested resources. Various embodiments of the present disclosure provide for the reconfiguration of computing devices in a cloud computing resource to facilitate the allocation of requested computing resources, where the value associated with fulfilling the request exceeds its cost. The value may be based not only on a price that a customer is willing to pay for the allocation, but also on other factors such as the lifetime value of the customer, the trust level of the customer, and so on.

In addition, various embodiments of the present disclosure may obtain competing requests for computing resource capacity in a cloud computing resource. Where such requests are conflicting, the highest value request may be accepted and allocated. Accepting the highest value request sometimes may involve reconfiguring computing devices to accommodate the requested resources. In the following discussion, a general description of the system and its components is provided, followed by a discussion of the operation of the same.

Figure 1:
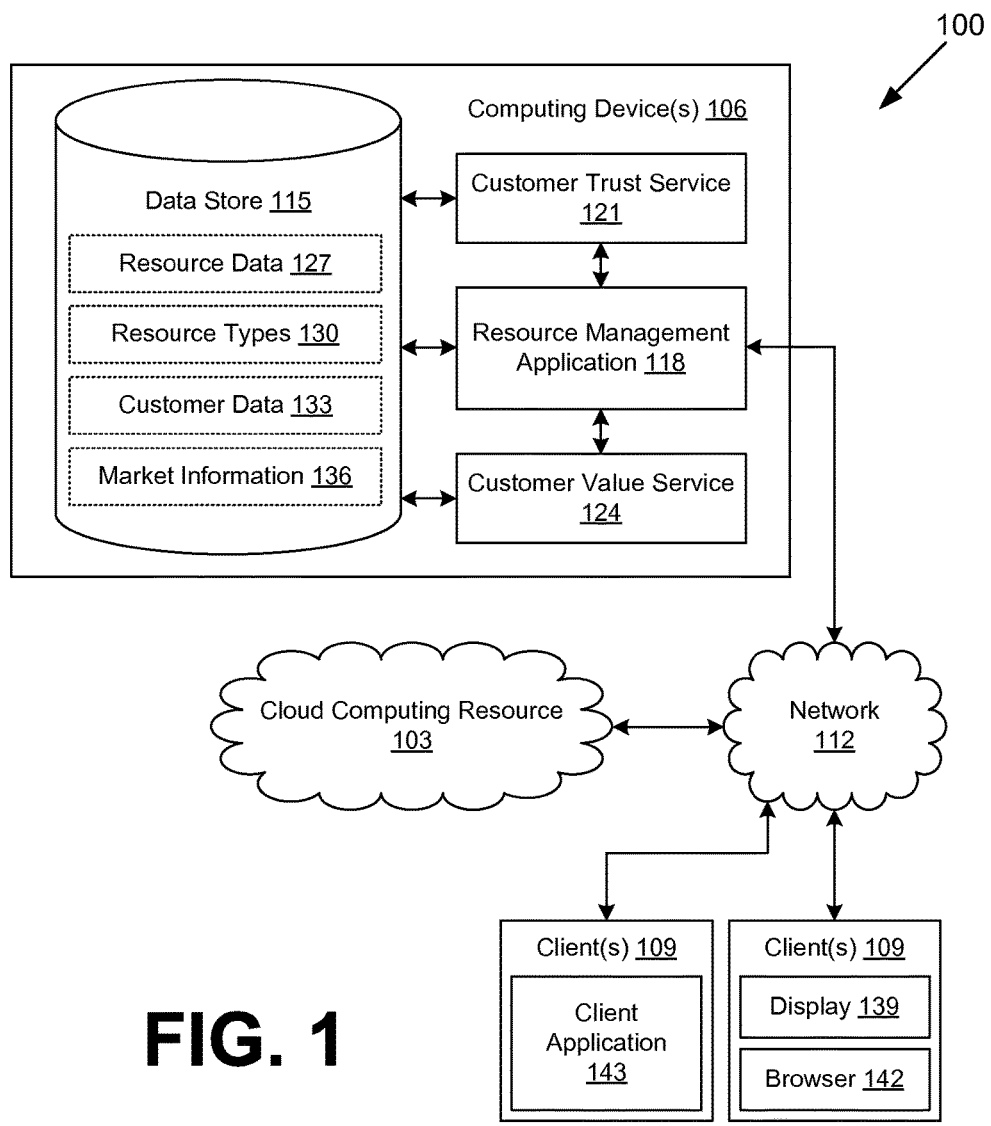
FIG. 1 is a drawing of a networked environment according to various embodiments of the present disclosure.

With reference to FIG. 1, shown is a networked environment 100 according to various embodiments. The networked environment 100 includes a cloud computing resource 103, one or more computing devices 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

Figure 2:
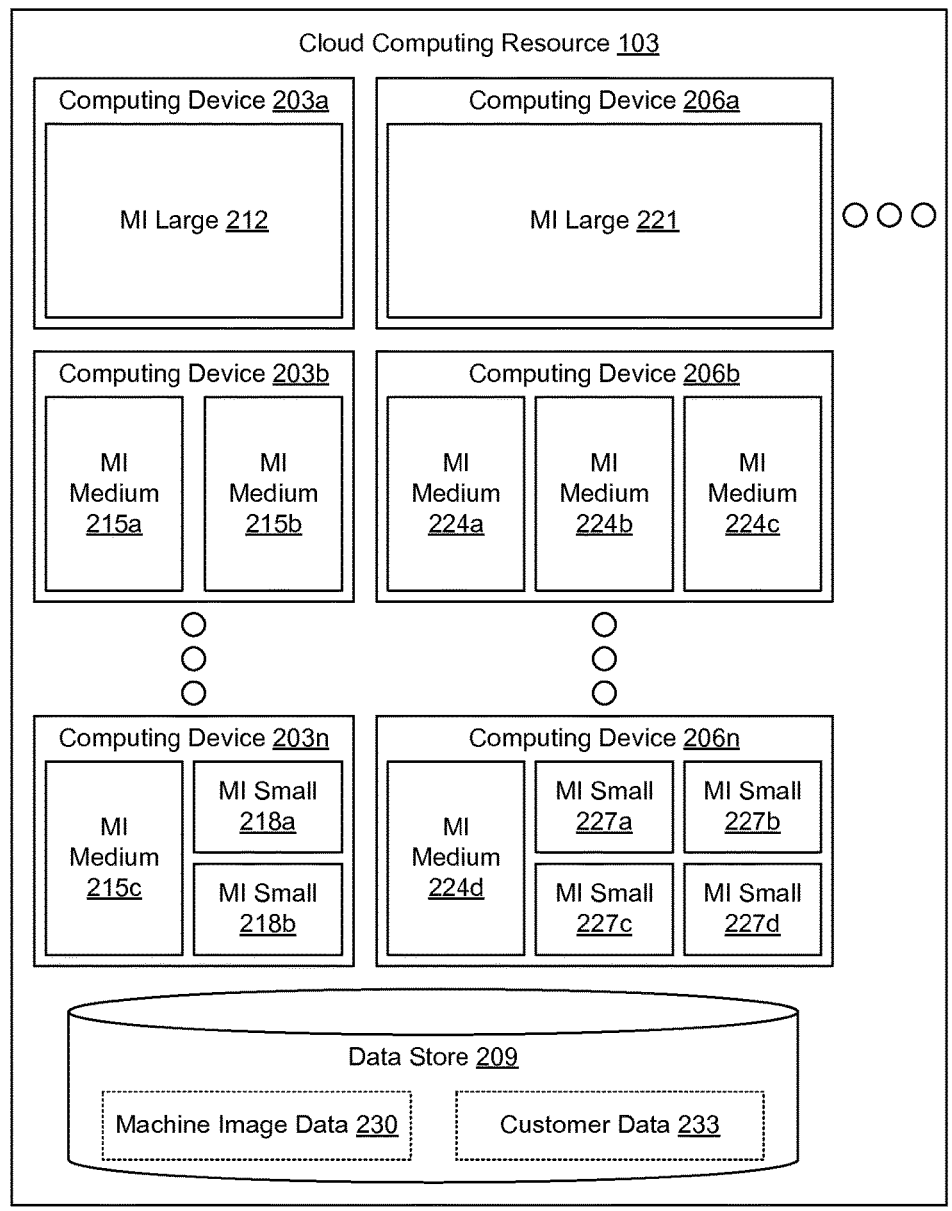
FIG. 2 is a drawing of one example of a cloud computing resource from the networked environment of FIG. 1 according to various embodiments of the present disclosure.

Referring next to FIG. 2, shown is one example of a cloud computing resource 103 according to various embodiments. The cloud computing resource 103 includes a plurality of computing devices 203a, 203b . . . 203n, a plurality of computing devices 206a, 206b . . . 206n, and a data store 209. Such components of the cloud computing resource 103 may be in data communication with each other and/or external computing devices 106 (FIG. 1) by way of a network 112 (FIG. 1). Such computing devices 203 and 206 may be located in a single installation or may be dispersed among many different geographical locations. The term "cloud computing resource" is not intended to be limiting. It is understood that the cloud computing resource 103 as used herein may refer to any plurality of networked computing devices.

Computing devices 203 and 206 may correspond to differing hardware platforms in various embodiments. Accordingly, computing devices 203 and 206 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 203a, 203b . . . 203n may have a first hardware configuration, while all computing devices 206a, 206b . . . 206n may have a second hardware configuration.

For example, the computing devices 203 may have a certain ratio of a first type of resource to a second type of resource, while the computing devices 206 may have a different ratio of the first type of resource to the second type of resource. In a specific example, the computing devices 203 may have a relatively high amount of memory, while the computing devices 206 may have a relatively high amount of CPU resources. In another specific example, the computing devices 203 may have a relatively high amount of CPU resources, while the computing devices 206 may have a relatively high amount of GPU resources. Although only two sets of computing devices 203 and 206 are shown, it is understood that there may be any number of sets of computing devices 203 and 206 having different hardware configurations.

As a non-limiting example, a customer who is planning to run a data store that will respond to a high volume of queries for small quantities of data may prefer to have a computing device 203, 206 with relatively high storage IOPS capability over storage bandwidth. By contrast, a customer who is planning to run an email archive may prefer to have a computing device 203, 206 with relatively high storage bandwidth capability over storage IOPS. The email archive may not respond to many requests, but when a request is received, a large quantity of bandwidth may be preferred to transfer data from the email archive.

Each computing device 203, 206 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 600 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer, though any customer may be associated with any number of machine instances.

In various embodiments, a customer may be capable of launching new machine instances and/or terminating machine instances dynamically. Thus, the cloud computing resource 103 may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance. However, the operator of the cloud computing resource 103 may need to ensure that spare computing capability is available in the cloud computing resource 103 to accommodate such new machine instances. At the same time, too much spare computing capability may be costly and resource inefficient.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. As a non-limiting example, the customer data 233 may include network pages to be served up by one or more network page servers executing on machine instances associated with a customer. However, it is understood that in some embodiments customer-specific data may be stored within local data storage associated with a machine instance.

Referring back to FIG. 1, the computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 115 that is accessible to the computing device 106. The data store 115 may be representative of a plurality of data stores 115 as can be appreciated. The data stored in the data store 115, for example, is associated with the operation of the various applications and/or functional entities described below.

The components executed on the computing device 106, for example, include a resource management application 118, a customer trust service 121, a customer value service 124, and other applications, services, processes, systems, engines, or functionality not discussed in detail herein. The resource management application 118 is executed to obtain and respond to requests by customers for the allocation of computing resources in the cloud computing resource 103. Sometimes this may involve merely allocating currently unallocated resources to the customer. However, the resource management application 118 is also capable of initiating the reconfiguration of computing devices 203, 206 in the cloud computing resource 103 so as to accommodate the customer request where it is profitable to do so. Further, when the resource management application 118 obtains multiple requests that contend for the allocation of limited resources, the resource management application 118 is configured to fulfill the request presenting the greatest profit or value.

The customer trust service 121 is executed to determine a level of trust associated with a customer. Various factors may determine the level of trust, such as, for example, length of time that the account of the customer has been established, whether a payment instrument of the customer has been billed successfully, whether the customer has provided a verified billing address, location of an internet protocol (IP) address associated with the customer, whether an email address of the customer has been validated, whether an outstanding bill of the customer is past due, and so on.

The customer value service 124 is executed to determine a lifetime value associated with a customer. A lifetime value is a value attached to the customer beyond a price, or currency amount, that the customer is willing to pay if the specific request is fulfilled. Such lifetime values may be manually or automatically assessed.

As a non-limiting example, the customer may have a longstanding business relationship with the operator of the cloud computing resource 103, making it important that requests for resources by the customer be given additional weight. As another non-limiting example, the customer may have negotiated a service level agreement with the operator to prioritize the requests of the customer for allocation of resources. It is noted that the lifetime value of the customer may be established for strategic business reasons which may be arbitrary with respect to profit. For example, the operator of the cloud computing resource 103 may assign a relatively high lifetime value to a new customer whose relationship is valuable from a strategic perspective. Such a lifetime value may be arbitrary with respect to the profit currently predicted to be generated from the new customer.

The data stored in the data store 115 includes, for example, resource data 127, resource types 130, customer data 133, market information 136, and potentially other data. The resource data 127 provides various information about the current status of the cloud computing resource 103 and its constituent computing devices 203, 206. For example, the resource data 127 may indicate allocated and unallocated capacity within the cloud computing resource 103. The resource data 127 may also indicate the current configuration of the cloud computing resource 103. Further, the resource data 127 may indicate the availability of the various types of machine instances (e.g., MI large 212, 221; MI medium 215, 224; MI small 218, 227, etc.) into which the computing devices 203, 206 are currently configured.

The resource types 130 may provide information regarding the various types of resources employed in the cloud computing resource 103. To this end, the resource types 130 may provide information regarding the computing devices 203, 206 and the various machine instances into which they may be configured. The resource types 130 may be used to determine potential mappings for dividing capacity of the computing devices 203, 206 into machine instances.

The customer data 133 includes various business-oriented data regarding customers. As non-limiting examples, the customer data 133 may include information regarding previous orders, customer account history, billing address and contact information, email addresses, whether account balances are current, IP address history, and other information. The market information 136 is used in setting current spot prices for unused capacity in the cloud computing resource 103. The market information 136 may take into account the current balance of supply and demand to arrive at potential spot prices. To this end, the market information 136 may include information regarding availability of unused capacity, whether currently allocated capacity may be reallocated, what customers are currently willing to bid for capacity, and so on.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 139. The display 139 may comprise, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a browser 142 and/or other applications. The browser 142 may be executed in a client 109, for example, to access and render network pages, such as web pages, or other network content served up by the computing device 106 and/or other servers, thereby generating a rendered network page on the display 139. The client 109 may be configured to execute applications beyond the browser 142 such as, for example, email applications, instant message applications, and/or other applications. In some embodiments, the client 109 may include a client application 143 that is capable of interfacing with the resource management application 118 in an automated manner. For example, the client application 143 may interact with the resource management application 118 through an application programming interface (API) or another interface. Further, the client application 143 may support various APIs that facilitate interaction between the client application 143 and other applications.

Next, a general description of the operation of the various components of the networked environment 100 is provided. In one embodiment, a customer at a client 109 submits a request for allocation of a computing resource in the cloud computing resource 103. The request may be submitted through a network page, email, telephone call, text message, and/or other channels of communication over the network 112. As a non-limiting example, the request may be for one or more machine instances in the cloud computing resource 103. The requested machine instances may be of one or more instance types. In another embodiment, the request may be generated automatically by the client application 143. For example, the client application 143 may determine that the customer will need to allocate additional resources to meet current or future resource demand based in part on resource usage metrics.

In response to the request, the resource management application 118 determines whether the request may be satisfied out of the available resources in the cloud computing resource 103 according to the current configuration. For example, various computing devices 203, 206 may already be configured into various machine instance types, either for prior users or speculatively based on forecasts of future demand for the instance types. In some cases, some instances may be currently occupied by other users but are considered as available resources because the other users have a lower priority and may be ejected in favor of users with a higher priority. Such priority classifications may be based on price paid and/or other factors.

If capacity is available with the current configuration, it is allocated to the customer in response to the request. However, it may be the case that capacity is available but is not currently configured to accommodate the request. As a non-limiting example, if a customer requests an MI medium 215 instance, capacity for an MI large 221 instance may be available. The MI medium 215 instance may fit on the corresponding computing device 206, but reconfiguration may be required. Disk drives on the computing device 206 may need to be repartitioned, the operating system on the computing device 206 may need reconfiguration, hardware may need to be added, and so on. Such tasks may be time intensive and may involve manually supervised tasks.

In some cases, the reconfiguration tasks may be completed relatively quickly, but the reconfiguration results in a suboptimal allocation of resources on the computing device 203, 206. As a non-limiting example, a customer may request the allocation of a machine instance without GPU resources. Such an instance may be allocated on a computing device 203, 206 with GPUs, but the allocation could be inefficient or suboptimal. In such a case, the reconfiguration to accommodate a non-GPU instance may be relatively simple.

Accordingly, the resource management application 118 is configured to weigh the cost and profitability associated with the reconfiguration. The reconfiguration itself may have a cost related to downtime and performing the tasks. Further, allocating the requested resource in the available capacity may result in inefficient use of the computing device 203, 206, meaning that the resources of the computing device 203, 206 may not be fully monetized. As a non-limiting example, a customer may request a high memory machine instance. The high memory machine instance may be allocated on a high CPU machine, with the inefficiency of leaving CPU resources unallocated and not fully monetized. In other words, a requested resource having a first ratio of processor resources to memory resources may be satisfied by another resource having a second ratio of processor resources to memory resources at a potential cost of an inefficient allocation.

The value to the operator of the cloud computing resource 103 may be generated in part based on a price that the customer is willing to pay for the request to be fulfilled. Additionally, the customer may be associated with a lifetime value as determined by the customer value service 124 and a level of trust as determined by the customer trust service 121. Such factors consider a longer term than the price obtained by immediately fulfilling the request, such as relationship with the customer, whether the customer is likely to pay for the requested resource for a specified duration, etc.

If the value to the operator outweighs the cost, the request may be fulfilled by way of the reconfiguration, provided that the reconfiguration may be completed within a time frame required by the customer. An identifier may be returned to the customer to allow the customer to access the resource when it is allocated after reconfiguration.

In various embodiments, multiple requests may be obtained that contend for the same capacity in the cloud computing resource 103. In some cases, the requests may specify duration for the allocation. As a non-limiting example, a first customer may place a bid for 100 MI small 218 instances at $0.02 per hour, and a second customer may place a bit for 50 MI small 218 instances at $0.05 per hour. If both of the requests cannot be satisfied at the same time, the resource management application 118 selects the request associated with a highest value. The first customer is willing to pay $2.00 per hour, while the second customer is willing to pay $2.50 per hour. The resource management application 118 may select the request associated with the second customer to be fulfilled in order to net the $2.50 per hour rate, which is the highest value.

As another non-limiting example, a first customer may place a bid for 120 MI small 218 instances at $0.02 per hour, while a second customer may place a bid for 30 MI large 212 instances at $0.10 per hour. Suppose that both requests need 15 computing devices 203 in order to be fulfilled, and that the available computing devices 203 are currently configured into MI small 218 instances. Fulfilling the request of the first customer would yield $2.40 per hour, while fulfilling the request of the second customer would yield $3.00 per hour. Accordingly, it may be profitable to reconfigure the computing devices 203 to accommodate the 30 MI large 212 instances, provided that the costs associated with the reconfiguration, etc. are below $0.60 per hour.

In some embodiments, the requests may be filtered based upon a minimum value. For example, a spot price may be established for MI small 218 instances, and requests that are not valued at the spot price may be rejected. It may be the case that all requests of the multiple requests are rejected if they are not associated with at least the minimum value. Additionally, in some embodiments, currently allocated computing resources may be deallocated to accommodate a new allocation based at least in part on determining that a value associated with the existing allocation is below a highest value request. Reconfiguration costs and inefficiencies may also be taken into consideration in determining whether to deallocate existing allocations of resources.

When a request for allocation of computing resources is rejected, a notification may be sent to the customer at the client 109. When a request for allocation of computing resources is accepted and fulfilled, an identifier of the newly allocated resource may be sent to the client 109. When a request for allocation of computing resources results in reconfiguration, a notification that the request is pending may be sent to the client 109, potentially along with an identifier of the resource that may be used to access it when it is allocated. Such notifications may be included within network pages, email messages, text messages, or other forms of communication.

Figure 3A:
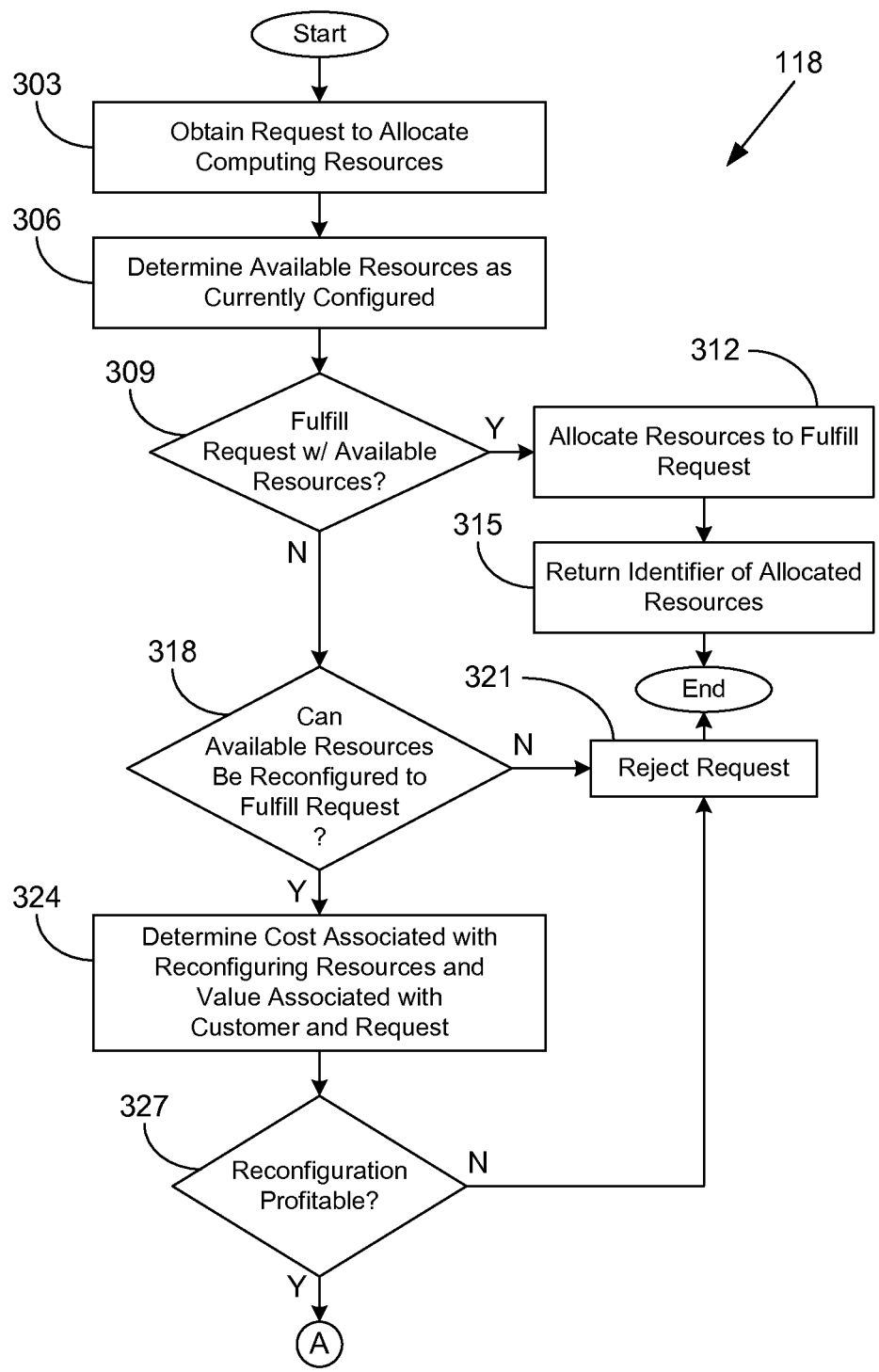
FIGS. 3A, 3B, and 4 are flowcharts illustrating examples of functionality implemented as portions of a resource management application executed in a computing device in the networked environment of FIG. 1 according to various embodiments of the present disclosure.
Figure 3B:
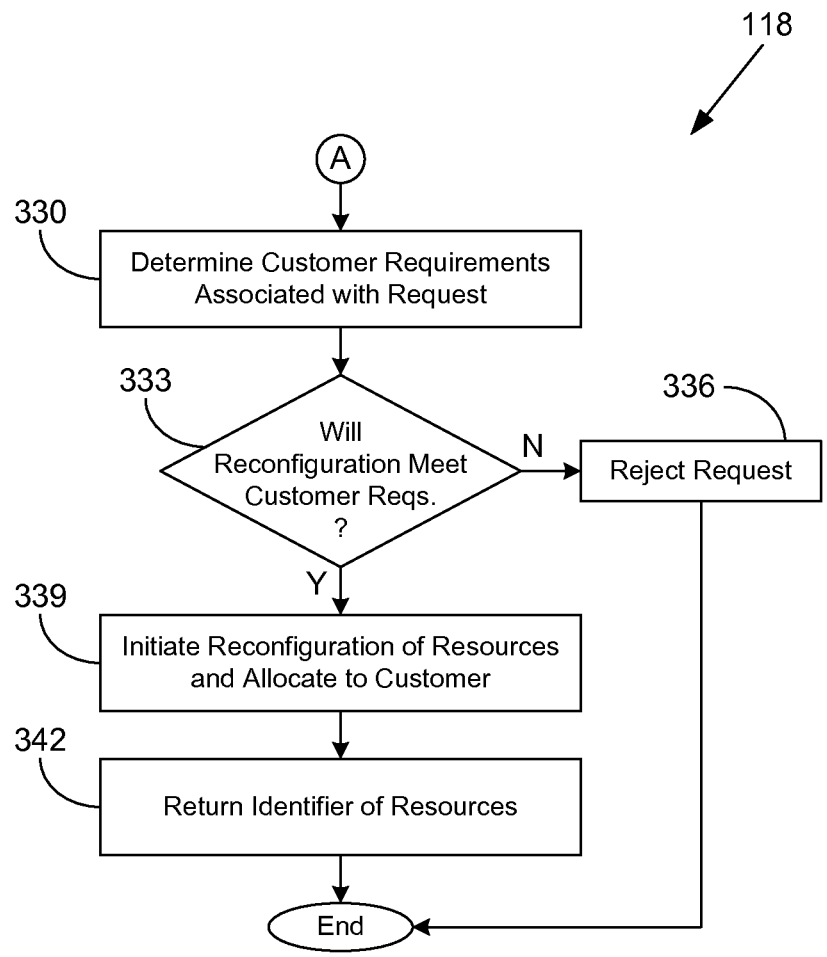

Referring next to FIGS. 3A and 3B, shown is a flowchart that provides one example of the operation of a portion of the resource management application 118 according to various embodiments. It is understood that the flowchart of FIGS. 3A and 3B provides merely an example of the many different types of functional arrangements that may be employed to implement the operation of the portion of the resource management application 118 as described herein. As an alternative, the flowchart of FIGS. 3A and 3B may be viewed as depicting an example of steps of a method implemented in the computing device 106 (FIG. 1) according to one or more embodiments.

Beginning with box 303, the resource management application 118 obtains a request from a client 109 (FIG. 1) to allocate computing resources in the cloud computing resource 103 (FIG. 1). The request is associated with a customer. In one embodiment, the requested computing resources correspond to one or more machine instances executing on one or more computing devices 203, 206 (FIG. 2). In box 306, the resource management application 118 determines the available resources of the cloud computing resource 103 as it is currently configured. To this end, the resource management application 118 may refer to stored data such as resource data 127 and/or other data. The resource management application 118 may also obtain data from monitoring services and/or other applications that are configured to monitor the status of the cloud computing resource 103.

In box 309, the resource management application 118 determines whether the request can be fulfilled with available resources of the cloud computing resource 103 as currently configured. As a non-limiting example, the request may be for allocating a dozen MI small 218 (FIG. 2) instances. If the resource management application 118 determines that capacity exists as currently configured for at least a dozen MI small 218 instances, the resource management application 118 determines that the request can be fulfilled. If the available capacity includes capacity for fewer than a dozen MI small 218 instances, the resource management application 118 determines that the request cannot be fulfilled from the cloud computing resource 103 as currently configured.

If the resource management application 118 determines that the request can be fulfilled from the available resources of the cloud computing resource 103 as currently configured, the resource management application 118 continues to box 312. In box 312, the resource management application 118 allocates the requested resources in the cloud computing resource 103 to the customer in order to fulfill the request. In box 315, the resource management application 118 returns an identifier of the allocated resources to the client 109. Thereafter, the portion of the resource management application 118 ends.

If the resource management application 118 determines in box 309 that the request cannot be fulfilled from the cloud computing resource 103 as currently configured, the resource management application 118 instead moves to box 318. In box 318, the resource management application 118 determines whether available resources of the cloud computing resource 103 may be reconfigured in order to fulfill the request. As a non-limiting example, suppose a request is made for three MI small 218 instances, and no MI small 218 instance are currently available. However, a computing device 203 currently configured to hold one MI large 212 (FIG. 2) instance might be reconfigured to hold four MI small 218 instances. If capacity for an MI large 212 is available, it may be reconfigured to fulfill the request.

If the resource management application 118 determines that the available capacity of the cloud computing resource 103 cannot be reconfigured to accommodate the request, the resource management application 118 moves to box 321 and rejects the request. In some embodiments, a notification of the rejection may be sent to the client 109. Thereafter, the portion of the resource management application 118 ends.

If, instead, the resource management application 118 determines in box 318 that the available resources of the cloud computing resource 103 may be reconfigured to fulfill the request, the resource management application 118 proceeds to box 324. In box 324, the resource management application 118 determines a cost associated with reconfiguring the resources and a value associated with the customer and request. Regarding cost, the operator of the cloud computing resource 103 may, for example, incur downtime associated with reconfiguring the resources. The operator may need to send someone out to a data center to perform one or more manually supervised tasks, which may be represented as a cost. Additionally, there are various costs associated with operating the computing devices 203, 206, such as power, data center space, climate control, hardware, network 112 connectivity, and so on.

It may be the case that reconfiguring one type of machine instance into another results in a lower overall monetization, effectively representing a cost. For example, servicing the request of this customer for MI small 218 instances may result in an inability to service another customer who would be willing to pay a higher price for the MI large 212 instance. Further, the reconfiguration may be inefficient and may result in spare capacity on one or more computing devices 203, 206 that cannot be fully monetized.

Regarding value, the request may be associated with a price that the customer is willing to pay for the request to be fulfilled. Moreover, the concept of value may include a lifetime value associated with the customer as determined by the customer value service 124 (FIG. 1) and a level of trust associated with the customer as determined by the customer trust service 121 (FIG. 1). In other words, the value associated with fulfilling the request may be based at least in part on factors beyond what the customer is willing to pay for the computing resources.

For example, the operator of the cloud computing resource 103 may be unwilling to reconfigure resources to fulfill a request from a customer who just established an account, has not verified a billing address or email address, and has an IP address located in a developing country, even if the customer is willing to pay a premium price. By contrast, a customer with a longstanding business relationship with the operator or who is projected to bring in significant business may be associated with a relatively high lifetime value that would outweigh a diminished price that the customer is willing to pay for the current request to be fulfilled.

Next, in box 327, the resource management application 118 determines whether fulfilling the request by performing the reconfiguration is predicted to be profitable based on the cost and value associated with the request. It is noted that predicted profitability of a request may be determined based in part on factors such as lifetime value and level of trust of the customer as discussed above. If fulfilling the request is not predicted to be profitable, the resource management application 118 proceeds to box 321 and rejects the request. In some embodiments, a notification may be sent to the client 109. Thereafter, the portion of the resource management application 118 ends.

If the resource management application 118 instead projects that fulfilling the request by performing the reconfiguration will be profitable, the resource management application 118 continues on to box 330. In box 330, the resource management application 118 determines the requirements of the customer associated with the request. For example, the customer may require that the computing resource be allocated immediately or otherwise within a defined time frame.

Next, in box 333, the resource management application 118 determines whether the reconfiguration will meet the requirements of the customer. As a non-limiting example, if the customer requires that the computing resource be made available within three hours, but the reconfiguration is predicted to take at least eight hours, the reconfiguration will not meet the requirements of the customer. If the reconfiguration will not meet the customer requirements, the resource management application 118 moves to box 336 and rejects the request. In some embodiments, a notification may be sent to the client 109. Further, an explanation may be made as to why the request was rejected, in order to allow the customer to adjust its requirements if desired. Thereafter, the portion of the resource management application 118 ends.

Otherwise, if the resource management application 118 determines that the reconfiguration will meet the customer requirements, in box 339, the resource management application 118 initiates the reconfiguration of the computing resources in the cloud computing resource 103 and allocates the requested computing resources to the customer. It is noted that such a reconfiguration may be a time-intensive process in some embodiments and may involve one or more manually supervised tasks, such as a person resetting a computing device 203, 206 in a data center. However, in some cases, the reconfiguration may merely involve adopting a suboptimal allocation of resources that can be performed rather quickly. In box 342, the resource management application 118 returns an identifier of the resources to the client 109. The identifier may be used to access the resources that have been allocated. If the reconfiguration is not complete, the identifier may be used to access the resources after the allocation is completed. Thereafter, the portion of the resource management application 118 ends.

Figure 4:
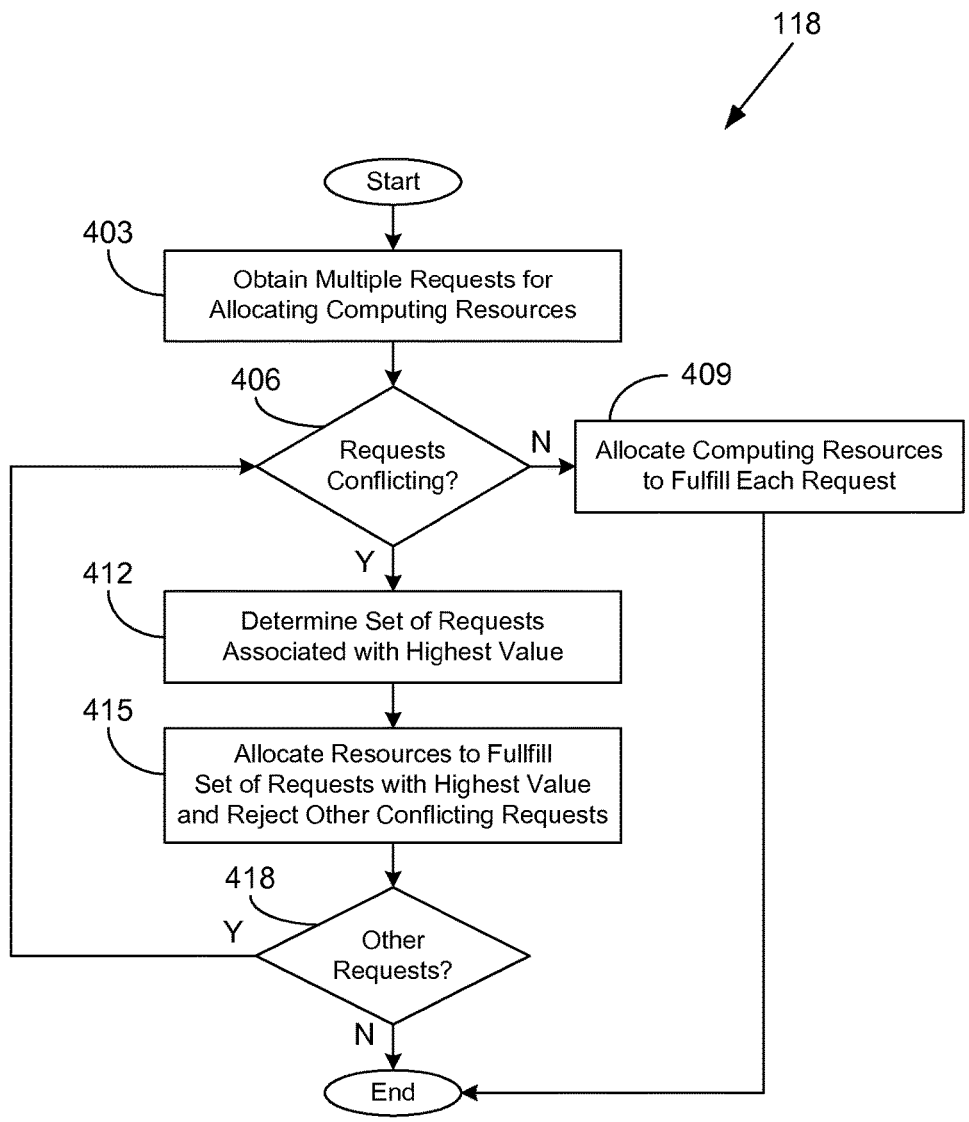

Turning now to FIG. 4, shown is a flowchart that provides another example of the operation of another portion of the resource management application 118 according to various embodiments. It is understood that the flowchart of FIG. 4 provides merely an example of the many different types of functional arrangements that may be employed to implement the operation of the portion of the resource management application 118 as described herein. As an alternative, the flowchart of FIG. 4 may be viewed as depicting an example of steps of a method implemented in the computing device 106 (FIG. 1) according to one or more embodiments.

Beginning with box 403, the resource management application 118 obtains multiple requests for allocating computing resources in the cloud computing resource 103 (FIG. 1) from clients 109 (FIG. 1). Each request is associated with a customer. In box 406, the resource management application 118 determines whether the requests are conflicting. In other words, the resource management application 118 determines whether fulfillment of any request is mutually exclusive. As a non-limiting example, one request may be for ten MI large 212 (FIG. 2) instances, while another request may be for twenty MI medium 215 (FIG. 2) instances. If the cloud computing resource 103 has only the available capacity to satisfy only one or the other of the two requests, the requests are considered conflicting. If the requests are not conflicting, the resource management application 118 proceeds to allocate computing resources to fulfill each of the requests in box 409. Thereafter, the portion of the resource management application 118 ends.

Otherwise, if the resource management application 118 determines that the requests are conflicting, the resource management application 118 proceeds to box 412 and determines a set of the requests that do not conflict with each other, where the set of requests is associated with a highest value, or potential profit, across the set of requests. Various factors may be used in determining a highest value, including price that the customer is willing to pay, level of trust and lifetime value of the customer, reconfiguration costs (if applicable), costs associated with inefficient allocation of resources, opportunity costs, and so on.

In box 415, the resource management application 118 allocates computing resources to fulfill the set of requests with the highest overall value. Additionally, the resource management application 118 rejects all of the other requests that conflict with the set of requests. In various embodiments, notification of rejection may be sent to the appropriate clients 109. Also, a notification of the allocation of the resources in response to the highest value requests may be sent to the appropriate client 109. In one embodiment, the notification may include an identifier of the resources that are allocated, or are to be allocated after a reconfiguration. In box 418, the resource management application 118 determines whether other requests remain to be rejected or fulfilled. If any of the requests remain, the resource management application returns to box 406 and processes the remaining requests. Otherwise, the portion of the resource management application 118 ends.

Figure 5:
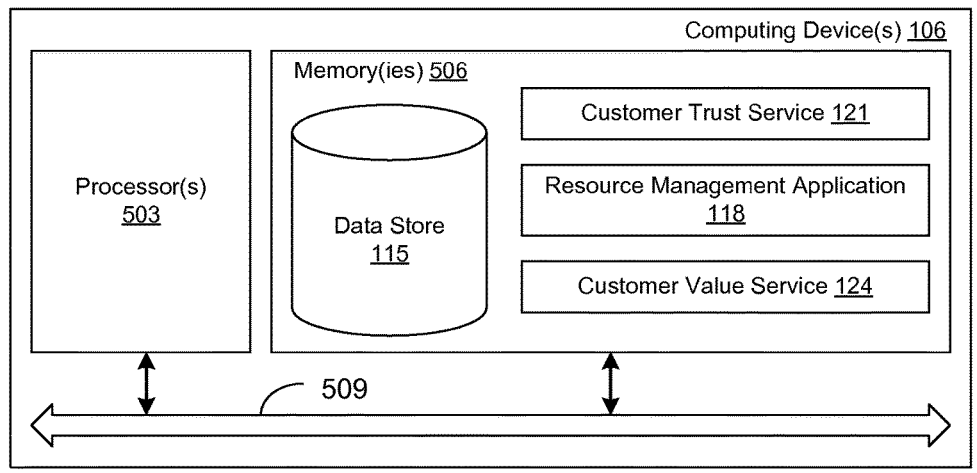
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 106 according to an embodiment of the present disclosure. The computing device 106 includes at least one processor circuit, for example, having a processor 503 and a memory 506, both of which are coupled to a local interface 509. To this end, the computing device 106 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the resource management application 118, the customer trust service 121, the customer value service 124, and potentially other applications. Also stored in the memory 506 may be a data store 115 and other data. In addition, an operating system may be stored in the memory 506 and executable by the processor 503.

Figure 6:
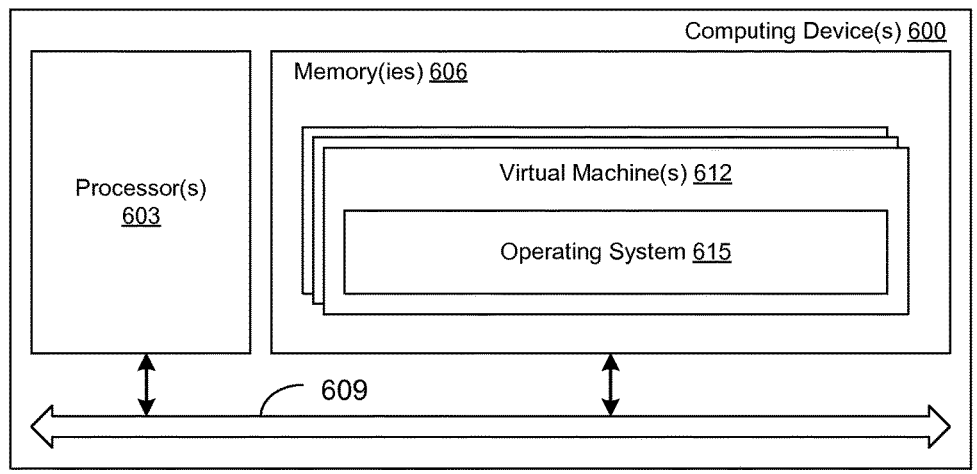
FIG. 6 is a schematic block diagram that provides one example illustration of a computing device employed in the cloud computing resource of the networked environment of FIG. 1 according to various embodiments of the present disclosure.

Turning now to FIG. 6, shown is a schematic block diagram of a computing device 600 according to an embodiment of the present disclosure. The computing device 600 is representative of a computing device 203, 206 (FIG. 2) used in the cloud computing resource 103 (FIG. 1). The computing device 600 includes at least one processor circuit, for example, having a processor 603 and a memory 606, both of which are coupled to a local interface 609. To this end, the computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are one or more virtual machines 612 and potentially other applications. Each virtual machine 612 is representative of an instance of a virtual machine such as, for example, MI large 212, 221 (FIG. 2), etc., executing in the computing device 600. Each virtual machine 612 may include an operating system 615 executable in the virtual machine 612 and any number of other applications and data. In addition, an operating system may be stored in the memory 606 and executable by the processor 603.

With reference to both FIGS. 5 and 6, it is understood that there may be other applications that are stored in the memories 506, 606 and are executable by the processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages. A number of software components are stored in the memories 506, 606 and are executable by the processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may represent multiple processors 503, 603 and the memories 506, 606 may represent multiple memories 506, 606 that operate in parallel processing circuits, respectively. In such a case, the local interfaces 509, 609 may be an appropriate network 112 (FIG. 1) that facilitates communication between any two of the multiple processors 503, 603, between any of the processors 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the resource management application 118, the customer trust service 121, the customer value service 124, the virtual machines 612, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A, 3B, and 4 show the functionality and operation of an implementation of one or more portions of the resource management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 503, 603 in a computer system or other system. The machine code may be converted from the source code, etc. If embodied in hardware, each block may represent a circuit or a number of interconnected circuits to implement the specified logical function(s).

Although the flowcharts of FIGS. 3A, 3B, and 4 show a specific order of execution, it is understood that the order of execution may differ from that which is depicted. For example, the order of execution of two or more blocks may be scrambled relative to the order shown. Also, two or more blocks shown in succession in FIGS. 3A, 3B, and 4 may be executed concurrently or with partial concurrence. Further, in some embodiments, one or more of the blocks shown in FIGS. 3A, 3B, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource management application 118, the customer trust service 121, the customer value service 124, and the virtual machines 612, that comprises software or code can be embodied in any non-transitory computer-readable medium for use by or in connection with an instruction execution system such as, for example, processors 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    at least one application executable in the at least one computing device, wherein when executed the at least one application causes the at least one computing device to at least:
        obtain a request to allocate a virtual machine instance of a first type in a computing device;
        determine that the request cannot be fulfilled according to a current configuration of the computing device;
        determine a cost associated with a reconfiguration of the computing device to accommodate the virtual machine instance of the first type, wherein the computing device is currently configured to accommodate a virtual machine instance of a second type;
        determine a value associated with the request;
        select the request for fulfillment instead of another mutually exclusive request in response to determining that the value minus the cost exceeds a second value associated with the other mutually exclusive request; and
        reconfigure the computing device to accommodate the virtual machine instance of the first type instead of the virtual machine instance of the second type in response to determining that the value exceeds the cost.

2. The system of claim 1, wherein the other mutually exclusive request is to allocate the virtual machine instance of the second type and would not involve the reconfiguration.

3. The system of claim 1, wherein when executed at least one application further causes the at least one computing device to determine that the reconfiguration can be performed within a time frame required by a customer associated with the request.

4. The system of claim 1, wherein when executed at least one application further causes the at least one computing device to determine the value based at least in part on whether a payment instrument associated with the request has been billed successfully.

5. The system of claim 1, wherein when executed at least one application further causes the at least one computing device to determine the cost based at least in part on a cost of a suboptimal allocation of resources on the computing device after the reconfiguration, wherein the suboptimal allocation of resources indicates that a quantity of resources are not fully monetized after the reconfiguration.

6. The system of claim 1, wherein when executed at least one application further causes the at least one computing device to determine the cost based at least in part on a cost of a downtime to perform the reconfiguration.

7. The system of claim 1, wherein when executed at least one application further causes the at least one computing device to determine the cost based at least in part on a cost of a manually supervised task to perform the reconfiguration.

8. The system of claim 7, wherein the manually supervised task comprises a manual reset of the computing device.

9. The system of claim 1, wherein the virtual machine instance of the second type is allocated to another customer prior to the reconfiguration.

10. The system of claim 1, wherein when executed at least one application further causes the at least one computing device to determine the value based at least in part on whether a location of an internet protocol address associated with the request.

11. The system of claim 1, wherein when executed at least one application further causes the at least one computing device to determine the value based at least in part on a length of time that a customer associated with the request is likely to pay for the virtual machine instance of the first type.

12. The system of claim 1, wherein when executed at least one application further causes the at least one computing device to determine the value based at least in part on whether an email address associated with the request has been validated.

13. The system of claim 1, wherein when executed at least one application further causes the at least one computing device to determine the value based at least in part on a length of a business relationship of a customer associated with the request.

14. The system of claim 1, wherein the virtual machine instance of the first type is configured with a first type of operating system, and the virtual machine instance of the second type is configured with a second type of operating system.

15. The system of claim 1, wherein the virtual machine instance of the first type is configured with a first amount of system memory, and the virtual machine instance of the second type is configured with a second amount of system memory.

16. The system of claim 1, wherein the virtual machine instance of the first type is configured with a first amount of processor equivalent units, and the virtual machine instance of the second type is configured with a second amount of processor equivalent units.

17. The system of claim 1, wherein the virtual machine instance of the first type is configured with a first amount of data storage, and the virtual machine instance of the second type is configured with a second amount of data storage.

18. A method, comprising:
obtaining, by at least one computing device, a request to allocate a virtual machine instance of a first type in a computing device;
determining, by the at least one computing device, that the request cannot be fulfilled according to a current configuration of the computing device;
determining, by the at least one computing device, a cost associated with a reconfiguration of the computing device to accommodate the virtual machine instance of the first type, wherein the computing device is currently configured to accommodate a virtual machine instance of a second type;
determining, by the at least one computing device, a value associated with the request;
selecting, by the at least one computing device, the request for fulfillment instead of another mutually exclusive request in response to determining that the value minus the cost exceeds a second value associated with the other mutually exclusive request; and
reconfiguring the computing device to accommodate the virtual machine instance of the first type instead of the virtual machine instance of the second type in response to determining that the value exceeds the cost.

19. The method of claim 18, further comprising selecting, by the at least one computing device, the request further in response to determining that the reconfiguration can be performed within a time frame required by a customer associated with the request.

20. The method of claim 18, further comprising determining, by the at least one computing device, the cost based at least in part on a cost of a suboptimal allocation of resources on the computing device after the reconfiguration, wherein the suboptimal allocation of resources indicates that a quantity of resources are not fully monetized after the reconfiguration.

21. The method of claim 18, further comprising determining, by the at least one computing device, the cost based at least in part on a cost of a manual reset of the computing device to perform the reconfiguration.

22. The method of claim 18, wherein the virtual machine instance of the second type is allocated to another customer prior to the reconfiguration.

23. The method of claim 18, further comprising determining, by the at least one computing device, the value based at least in part on whether an email address associated with the request has been validated.

24. The method of claim 18, further comprising determining, by the at least one computing device, the value based at least in part on a length of a business relationship of a customer associated with the request.

25. The method of claim 18, wherein the other mutually exclusive request is to allocate the virtual machine instance of the second type and would not involve the reconfiguration.

26. A non-transitory computer-readable medium embodying a program executable in at least one computing device, wherein when executed the program causes the at least one computing device to at least:
obtain a request to allocate a virtual machine instance of a first type in a computing device;
determine that the request cannot be fulfilled according to a current configuration of the computing device;
determine a cost associated with a reconfiguration of the computing device to accommodate the virtual machine instance of the first type, wherein the computing device is currently configured to accommodate a virtual machine instance of a second type;
determine a value associated with the request;
select the request for fulfillment instead of another mutually exclusive request in response to determining that the value minus the cost exceeds a value associated with the other mutually exclusive request; and
reconfigure the computing device to accommodate the virtual machine instance of the first type instead of the virtual machine instance of the second type in response to determining that the value exceeds the cost.

27. The non-transitory computer-readable medium of claim 26, wherein the other mutually exclusive request is to allocate the virtual machine instance of the second type and would not involve the reconfiguration.

28. The non-transitory computer-readable medium of claim 26, wherein when executed the program further causes the at least one computing device to at least determine that the reconfiguration can be performed within a time frame required by a customer associated with the request.

29. The non-transitory computer-readable medium of claim 26, wherein when executed the program further causes the at least one computing device to at least determine the cost based at least in part on a cost of a downtime to perform the reconfiguration.

* * * * *